United States Patent Office 3,516,792
Patented June 23, 1970

3,516,792
RECOVERY OF HALOGEN
William K. T. Gleim, Island Lake, Ill., assignor to Universal Oil Products Company, Des Plaines, Ill., a corporation of Delaware
No Drawing. Continuation-in-part of application Ser. No. 634,073, Apr. 27, 1967. This application Nov. 12, 1968, Ser. No. 775,205
Int. Cl. C01b 9/04, 9/06
U.S. Cl. 23—216                 4 Claims

ABSTRACT OF THE DISCLOSURE

A method for recovering halogen from a mixture of the hydride thereof with hydrogen and gaseous hydrocarbons. The halogen hydride-containing gaseous mixture is contacted, at elevated temperature, with a dioxide of manganese, to form the metallic halide. The oxidation of the metallic halide effects the release of the elemental halogen.

RELATED APPLICATION

The present application is a continuation-in-part of my copending application, Ser. No. 634,073, filed Apr. 27, 1967, now abandoned, all the teachings of which copending application are incorporated herein by specific reference thereto.

APPLICABILITY OF INVENTION

The present invention involves a series of integrated steps designed to recover elemental halogen from a mixture of the hydride thereof with hydrogen and hydrocarbons. As such, the present invention is adaptable especially for integration into a process which employs the so-called "halogen" cycle for the preparation of olefinic hydrocarbons from aliphatic hydrocarbons. In this type process, the aliphatic hydrocarbon is first halogenated with a halogen, generally from the group of chlorine, iodine and bromine, and the halogenated product subjected to dehydrohalogenation to form the corresponding halogen hydride and olefins.

The present invention affords an improvement in those processes which employ the halogen hydrides where the halogen is especially selected from the group consisting of iodine and bromine, as well as mixtures thereof. It is understood that the inventive concept described herein is also applicable to those processes which admix the charge stock with an elemental halogen since the halogen becomes the hydride within the reaction or conversion zone as a result of the hydrogen therein.

In a broad embodiment, therefore, the present invention constitutes a process for recovering a halogen, having an atomic number of from 17 to 53, from a mixture of the hydride thereof with hydrocarbons and hydrogen, which process comprises contacting said mixture with a dioxide of manganese, oxidizing the resulting metal halide in an excess of a free oxygen-containing gas, and recovering the elemental halogen.

In a more specific embodiment, my invention relates to a process for recovering elemental bromine or iodine from a mixture of the hydride thereof with hydrogen and normally gaseous hydrocarbons, which process comprises contacting said mixture with manganese dioxide at a temperature of from about 0° C. to about 100° C. to convert the manganese dioxide to manganese halide, thereby separating said hydride from the hydrogen and hydrocarbons, oxidizing said manganese halide with free oxygen at a temperature of from about 10° C. to about 200° C. to liberate the bromine or iodine therefrom, and to convert the manganese halide to the lower oxide $Mn_3O_4$, and then oxidizing said $Mn_3O_4$ with free oxygen at an increased temperature to convert the same to manganese dioxide for reuse in the process.

Other embodiments involve operating temperatures, and the various operating conditions, etc. of the particular conversion process to which the present concept is adapted.

PRIOR ART

Candor compels recognition of the fact that art does exist in the area of halogen hydride use for treating and other hydrocarbon conversion, and also the use of halogen in processes for the conversion of aliphatic material into unsaturates. Exemplary of the prior art which discloses the use of halogen hydrides in the treatment of hydrocarbonaceous material are the following: U.S. Pat. No. 3,044,956 (Cl. 208–252), U.S. Pat. No. 2,744,853 (Cl. 208–251) and U.S. Pat. No. 2,729,593 (Cl. 208–251).

A cursory perusal of this prior art reveals that there is no concern or recognition of the possible recovery of the halogen for subsequent reuse. In fact, the halogen hydrides are disclosed as becoming a component of a resulting product sludge by way of the formation of high molecular weight insoluble halides. At least a portion of this sludge consists of ammonium halides resulting from the release of ammonia during the conversion of nitrogenous compounds. Therefore, when applied to hydrocarbon hydro refining/hydrocracking processes, it is understood that the useof the present recovery method is necessarily limited to those processes in which ammonium halides are not formed.

Typical of the available art concerned with dehydrogenation, and the use of a halogen therein, is U.S. Pat. No. 2,867,671 (Cl. 260–266) which discloses the use of elemental bromine in the dehydrogenation of saturated hydroaromatics to cycloolefins. There is not, however, any concern indicated from the recovery and/or reuse of the bromine. U.S. Pat. No. 2,613,233 (Cl. 260–677) is principally directed toward the chlorination of diisopropyl followed by dehydrochlorination to produce mono-olefinic derivatives. While there is an attempt to recover hydrogen chloride, it must be noted that the hydrogen chloride is recycled to the dehydrochlorination reaction zone to serve therein as a catalyst activator.

SUMMARY OF INVENTION

In view of the foregoing described embodiments, and the brief discussion of the prior art, it is readily ascertained that the present invention offers an improvement in those processes designed to convert and/or treat substantially nitrogen-free hydrocarbon charge stocks using hydrogen bromide and/or iodide. In the interest of brevity, the following will be limited to the use of hydrogen iodide and/or elemental iodine.

A substantially nitrogen-free hydrocarbonaceous charge stock, boiling in the range of about 450° F., to about 650° F., normally considered a light gas oil, is intended for use as charge to a cracking unit for the purpose of producing maximum quantities of gasoline boiling range material and a kerosene fraction boiling between about 380° F. and 525° F. The charge stock is admixed with hydrogen in a concentration of from about 3000 to about 25,000 S.C.F./bbl. and from about 1.0% to about 30.0% by weight of hydrogen iodide. The mixture is introduced into a suitable enclosed vessel maintained at a pressure in the range of from 500 to about 4000 p.s.i.g. Prior to entering the conversion zone, the mixture is heated to the desired temperature in the range of from about 600° F. to about 900° F., the precise conditions and concentration of HI (or elemental iodine) being dependent upon the physical and/or chemical characteristics of the charge stock, as well as the ultimately desired end result.

In any event, under these conditions, and in the presence of the anhydrous hydrogen iodide, any sulfurous compounds contained in the charge stock will be converted into hydrogen sulfide and hydrocarbons, and the material boiling above 525° F. will be converted into lower-boiling hydrocarbon products. Although a myraid of technical problems are associated with such a process—e.g. much the same as in "HF-Alkylation"—the present invention is primarily concerned with the difficulties encountered in the separation of the total conversion zone product effluent.

Usually, the product effluent is cooled to a temperature of about 300° F., for example by serving as a heat-exchange medium, and introduced, without substantial pressure reduction into a cold separator at a temperature of about 60° F. to about 130° F. The condensed liquid phase is further separated as desired in conventional separating means well within the purview of one skilled in the art. The present concept is concerned with the principally vaporous stream from the cold separator.

The gaseous phase from the cold separator contains hydrogen, hydrogen iodide, hydrogen sulfide, methane, ethane, propane and sometimes a minor amount of butane. Depending upon the temperature under which the cold separator functions, there may be trace quantities of pentanes and hexanes in this stream. Usually, however, the cold separator functions at conditions such that very little, if any, hydrocarbons heavier than propane are removed in the vapor phase. The hydrogen is intended to be recycled to the conversion zone, and the gaseous phase is, therefore, subjected to various described techniques in order to remove other constituents, thereby effecting an increase in hydrogen concentration. Normally, the recovery of the hydrogen iodide, also intended for recycle to the conversion zone, would be difficult and tedious to achieve. In accordance with the present method, the hydrogen iodide is recovered as elemental iodine, and the latter is re-employed in the conversion process since it readily forms hydrogen iodide in the reaction zone.

The gases are passed into and through a vessel containing a dioxide of manganese, at a temperature of about 0° to about 100° C. The conversion may be effected at atmospheric pressure, although an elevated pressure up to about 3000 p.s.i.g. is preferred in view of the fact that the hydrogen is to be recycled at an elevated pressure. The manganese iodide, $MnI_2$ for example, is oxidized in an excess of an oxygen-containing gaseous stream such as air, at a temperature of from 10° C. to about 200° C. thereby forming elemental iodine and $Mn_3O_4$. The temperature of the free oxygen-containing gas is then increased to a level of about 100° C. to about 300° C. in order to convert the lower manganese oxide to the dioxide form. It will be readily recognized that this scheme lends itself to a so-called "swing-bed" system in which the HI-containing gases are passed through one or more beds of manganese dioxide, while one or more beds of manganese iodide are being first converted to the lower oxide to free the iodine then to the dioxide form. The resulting elemental iodine is perhaps most readily recycled to the conversion zone by being dissolved in a portion of the hydrocarbonaceous charge stock.

Examples

Although it is believed that the foregoing description of my invention will enable those possessing skill in the art, especially as directed to hydrocarbon conversion using a halogen hydride, to practice the same, the following is presented for further illustration, and to indicate one particular method for integrating the present scheme into a dehydrogenation process.

The selected hydrocarbon, in this particular instance butane, is charged to a bromination zone in admixture with bromine. The bromine is principally recycle bromine, formed as hereinafter described, with make-up bromine being introduced only as required to maintain the selected bromine/hydrocarbon mol ratio. The hydrocarbon is charged to the bromination zone in excess of stoichiometric amounts, which excess may be as much as about 20 mols per mol of bromine. It is generally preferred to charge lesser amouts, for example, in the case of butane, the excess is about 10 mols per mol of bromine, the desired bromination product being bromobutane. Where the desired bromination product is a dibromide and the hydrocarbon charged is a paraffin such as pentane, the ratio is further reduced to a level of from about 5:1 to about 2:1. Although it may be desirable to employ superatmospheric pressures, for example to maintain the reactants in a liquid phase or to facilitate the process flow, pressure is not considered to be an important variable in the bromination process, and may be simply autogenous pressure developed during the course of the bromination reaction. Also, the bromination may be conducted as a liquid phase or a vapor phase reaction. In the present case, butane was brominated in the vapor phase at substantially atmospheric pressure.

The hydrocarbon is charged to the bromination zone in admixture with bromine at a rate which will insure substantially complete reaction of the bromine admixed therewith. Completion of the reaction may be determined by observation of the bromination zone effluent stream, a colorless stream indicating complete reaction of the bromine. In the case of the butane and bromine charged in a 10:1 mol ratio, substantially complete reaction of the bromine is achieved at a gaseous hourly space velocity of 1000 and at a temperature of about 300° C. Gaseous hourly space velocities of from about 500 to about 2500 may be utilized.

Bromination is effected at a temperature of from about 0° C. to about 100° C. The temperature utilized in any given situation is dependent upon the particular hydrocarbon to be brominated. Paraffins containing a tertiary carbon atom are more readily brominated than the normal or cycloparaffins, and require lower temperatures, say from about 0° C. to about 50° C. Olefins are also readily brominated at a reduced temperature which may be from about 0° C. to about 50° C. The bromination zone may comprise a packed or unpacked vessel. In the former case the packing may be catalytic material such as copper oxide on alumina, platinum on alumina, etc., or an inert material such as glass chips or beads.

The bromination reaction mixture is withdrawn from the bromination zone, and subjected to fractional distillation in a first separation zone. Any hydrogen bromide, which may have been formed in the bromination process, is distilled overhead, and conducted to an oxidation zone. The desired bromination product—a bromo derivative of the aforesaid hydrocarbon—is withdrawn as the lower boiling fraction and passes to a dehydrobromination zone. The excess hydrocarbon, charged to the bromination zone in the first instance, is recovered as an intermediate cut, and is recycled to the aforesaid bromination zone. The bromination reaction mixture may further comprise a small amount of heavier hydrocarbon by-products which can be recovered as bottoms material from the fractionation zone. In the bromination of butane, the hydrocarbon by-products are $C_7$–$C_{10}$ hydrocarbons comprising about 0.5% of the effluent stream from the bromination zone.

Dehydrobromination is generally carried out at an elevated temperature which may be from about 50° C. to about 550° C. Temperatures in the higher range, from about 200° C. to about 550° C., are employed when the bromination product is a dibromide, as is generally the case where the hydrocarbon brominated was an olefin, and the desired product is a diolefin. Temperatures in the lower range, from about 50° C. to about 400° C. are suitable where the bromination product is a monobromide, the dehydrobromination product being a monoolefin.

The dehydrobromination process is enhanced by the inclusion of a suitable dehydrobromination agent in the dehydrobromination zone. Suitable dehydrobrominating agents include calcium chloride, barium chloride, bismuth chloride, calcium sulfate, mercuric chloride, alumina, titania, thoria, magnesia, etc., or metal complexes such as ferro-molybdenum, ferro-manganese, ferro-chrome, ferro-aluminum, nickel-aluminum, phosphor-iron, and the like. The bromobutane of the present example is processed over granular calcium chloride in the aforementioned dehydrobromination zone at a temperature of 300° C., and at an LHSV of about 1.2.

The effluent stream from the dehydrobromination zone passes to a second separation zone. The effluent stream is separated therein by distillation methods into a hydrogen bromide fraction, and an unsaturated hydrocarbon derivative of the aforesaid bromination product. Any of the bromination product unconverted in the dehydrobromination is recovered as bottoms material and recycled to the aforementioned dehydrobromination zone for further treatment therein. The unsaturated hydrocarbon product, which in this case is butylene, is recovered as an intermediate side-cut, and passed through a caustic scrubber to remove any entrained hydrogen bromide. Dehydrobromination of butyl bromide in the present example indicates a 97.4–99.9% conversion to butylene.

Hydrogen bromide is distilled overhead, and passes to the aforementioned oxidation zone in combination with the hydrogen bromide stream from the first separation zone. Bromine is reformed from the hydrogen bromide in said oxidation zone at conditions effecting the oxidation of combined bromine. The oxidation is accomplished in the presence of air or other free oxygen-containing gas. Chemical equilibrium, pertaining to the oxidation reaction wherein combined bromine, such as hydrogen bromide or the hereinafter described metal bromides, is oxidized to bromine and water, is highly favorable to substantially complete conversion at the comparatively moderate temperature of from about 50° C. to about 100° C. The hydrogen bromide may be charged to the oxidation zone concurrently with air, or other oxygen-containing gas.

The gaseous material introduced into the oxidation zone is a mixture of hydrogen, hydrogen bromide and light, principally paraffinic hydrocarbons including methane, ethane and a minor quantity of propane. The latter stems from a minor degree of hydrocracking in which a portion of the butane charged, as well as some of the $C_7$–$C_{10}$ hydrocarbons, are subjected to scission of carbon-to-carbon bonds. A bromine balance indicates that this stream contains 92.0% to about 98.0% of the bromine (on a once-through basis) originally introduced into the bromination zone as previously described. Obvious economic considerations compel recovery thereof in order to provide a process having commercial possibilities.

The material is passed, preferably at substantially the same pressure, over and through a packed zone of manganese dioxide which is at a temperature of about 65° C. The hydrogen bromide-free, hydrogen-containing gaseous phase is then subjected to severe cooling to remove substantial amounts of normally gaseous hydrocarbons—in most instances, the cooling is such that the resulting gas phase is substantially propane-free—and to raise the hydrogen concentration to a level of at least 80.0% by volume. The hydrogen-rich gaseous stream is then recycled to combine with fresh hydrocarbon charge stock by way of compressive means.

When the packed bed of manganese dioxide is virtually completely converted to the bromide, as shown by an analysis of the exit gases, a companion bed is placed on-stream and the vessel with the manganese bromide bed is cut out of the system.

Air is introduced into the bottom of the vessel containing manganese bromide at a rate of about 100 s.c.f./hour and a temperature of about 100° C. The pressure is atmospheric, although pressures up to a level of about 100 p.s.i.g. are suitably employed. The manganese bromide is decomposed to form elemental bromine, and the lower oxide of manganese, $Mn_3O_4$, the former being recycled, following addition of supplemental bromine to account for that which is lost, to combine with the fresh hydrocarbon charge stock. The temperature of the air is then increased to about 200° C. and the $Mn_3O_4$ is oxidized to the dioxide form. At this time, the packed vessel is ready to "swing" into service in place of the companion bed containing manganese dioxide which is being converted to the bromide.

The foregoing specification illustrates the incorporation of the present halogen recovery system into a hydrocarbon conversion process. The recovery of halogen has been accomplished in a relatively simple and economical manner, and provides, therefore, a ready solution to an otherwise difficult problem.

I claim as my invention:

1. A process for recovering halogen selected from elemental bromine and elemental iodine from a mixture of the hydride thereof with hydrogen and normally gaseous hydrocarbons, which process comprises contacting said mixture with manganese dioxide at a temperature of from about 0° C. to about 100° C. to convert the manganese dioxide to manganese halide, thereby separating said hydride from the hydrogen and hydrocarbons, oxidizing said manganese halide with free oxygen at a temperature of from about 10° C. to about 200° C. to liberate the bromine or iodine therefrom, and to convert the manganese halide to the lower oxide $Mn_3O_4$, and then oxidizing said $Mn_3O_4$ with free oxygen at an increased temperature to convert the same to manganese dioxide for reuse in the process.

2. The process of claim 1 further characterized in that said increased temperature is below about 300° C.

3. The process of claim 1 further characterized in that said halogen is bromine and said manganese halide is manganese bromide.

4. The process of claim 3 further characterized in that the temperature of converting the manganese dioxide to manganese bromide is about 65° C., the first-mentioned oxidation temperature is about 100° C., and said increased oxidation temperature is about 200° C.

References Cited

UNITED STATES PATENTS

| | | | |
|---|---|---|---|
| 348,348 | 8/1886 | Rumpf | 23—219 |
| 2,163,877 | 6/1939 | Hooker | 23—216 |
| 2,395,314 | 2/1946 | Blumer | 23—219 |
| 3,346,340 | 10/1967 | Louvar | 23—216 |

OTHER REFERENCES

Mellor: A Comprehensive Treatise on Inorganic and Theoretical Chemistry; vol. II, Longmans, Greene & Co., New York, 1922, pp. 28–29, 31–34.

OSCAR R. VERTIZ, Primary Examiner

G. O. PETERS, Assistant Examiner